United States Patent Office 3,629,221
Patented Dec. 21, 1971

3,629,221
PROCESS FOR MANUFACTURING POLYMERS OF DICYCLOPENTADIENE DERIVATIVES
Morimasa Arakawa, Ashiya, Akisato Katanosaka, Osaka, and Masafumi Chikazawa, Kyoto, Japan, assignors to Arakawa Rinsan Kagaku Kogyo Kabushiki Kaisha, Osaka-shi, Japan
No Drawing. Filed June 2, 1970, Ser. No. 42,866
Claims priority, application Japan, June 5, 1969, 44/44,485
Int. Cl. C08f 5/00
U.S. Cl. 260—93.1  5 Claims

ABSTRACT OF THE DISCLOSURE

A process for manufacturing a polymer of dicyclopentadiene derivative comprises hydrogenating dicyclopentadiene to produce dihydrodicyclopentadiene and polymerizing the resultant dihydrodicyclopentadiene in the presence of a metal halide catalyst.

This invention relates to manufacture of a hydrocarbon resin, and more particularly to a process for manufacturing a polymer of a dicyclopentadiene derivative.

Dicyclopentadiene may be obtained in a large quantity from cracking process of petroleum naphtha but has been little used for industrial purpose. While it is known that this waste substance is polymerized in the presence of a metal halide catalyst, such as AlCl₃, for example, the resultant polymer thereof has almost no use because it contains a large amount of extremely high molecular weight substance hardly soluble in organic solvents and having high order of melting point. Even if the polymer is hydrogenated no properties are improved for developing its use. It is reported that the dicyclopentadiene is polymerized by ring-opening-polymerization in the presence of a specific Ziegler catalyst, but no report has been made as to the uses and effects of the resultant polymer. In addition the catalyst which can be used according to this method is limited to a specific one which is expensive and easily decomposes in the presence of water.

Natural hydrocarbon resins such as terpene resin and rosin have been widely used as a resin component for an adhesive, paint, sealer, etc., particularly as a tackifier for elastomers, and many attempts have been made to provide synthetic resins which can be substituted with the terpene resin or rosin. As far as we are aware, however, no synthetic resins similar to or superior to the natural resins have been proposed yet. When petroleum resin is used as a tackifier for pressure sensitive adhesive, for example, the resultant adhesive shows poor tackiness, adhesion and cohesion as compared with the adhesive in which terpene resin or rosin is used as a tackifier.

It is accordingly one object of the invention to provide new development of the industrial use of the chemical waste, dicyclopentadiene.

Another object of the invention is to provide a polymer of a dicyclopentadiene derivative which has excellent physical properties similar to or superior to those of natural hydrocarbon resins such as terpene resin and rosin and can be used in place of the terpene resin and rosin in a wide variety of uses.

A further object of the invention is to provide a process for manufacturing a polymer from a dicyclopentadiene obtained from a cracking process of petroleum naphtha, said polymer having useful characteristics similar to or superior to those of the natural resin.

A still further object of the invention is to provide a process for polymerizing a dicyclopentadiene derivative, whereby making it possible to obtain a useful polymer using a metal halide catalyst which is so far inexpensive and easily available as compared with the Ziegler catalysts so far used for polymerization dicyclopentadiene.

These and other objects and advantages of the invention will be apparent from the following description.

The process of the invention comprises selectively hydrogenating dicyclopentadiene to produce dihydrodicyclopentadiene and polymerizing the resultant dihydrodicyclopentadiene in the presence of a metal halide catalyst.

The reaction equations of the present process are represented as follows:

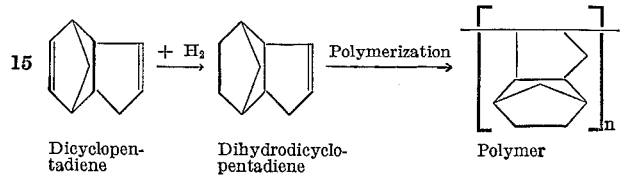

Dicyclopentadiene   Dihydrodicyclopentadiene   Polymer

According to the researches of the present inventors it has been found that when dicyclopentadiene is first hydrogenated to produce dihydrodicyclopentadiene and the resultant dihydrodicyclopentadiene is subsequently polymerized in the presence of a metal halide catalyst polymers having excellent physical properties similar to or superior to those of terpene resin or rosin can be obtained, whereas such useful polymer can never be obtained when dicyclopentadiene is first polymerized in the presence of a metal halide catalyst and thereafter hydrogenated.

The polymers obtained by the present method, for example, have usually a softening point ranging from 30 to 150° C. and are soluble in various organic solvents, such as aliphatic hydrocarbons, aromatic hydrocarbons, alicyclic hydrocarbons, ethers, esters, ketones, halogenated hydrocrabons etc., these properties being available for various purposes. Further, the present polymers are light in color and excellent in weather-proofing and chemical-resistant properties and has good compatibility with elastomers as is the case with terpene resin. Thus the polymers of the invention can be used in various fields in which terpene resin or rosin has so far been widely used, for example, as resin component for hot-melt adhesive, paint, sealer, sizing agent for paper, floor tile, road marking paint, etc. Particularly, the polymer of the present invention is useful as tackifier for elastomers. When used as tackifier, in fact, it displays excellent tackiness, adhesion and cohesion which are almost similar to terpene resin or rosin. Moreover, the resultant polymer of the invention may be hydrogenated in the conventional manner, as required, whereby color and weather-proofing property thereof can further be improved. The hydrogenated polymer is especially useful as a base for chewing gum, additives for polyolefins and like plastics, etc. in addition to the above uses.

According to the present invention dicyclopentadiene, which is obtained as waste fraction in a large quantity from cracking process of petroleum naphtha, is first hydrogenated. As the norbornene ring of the dicyclopentadiene is by far easily hydrogenated as compared with the cyclopentene ring of the dicyclopentadiene, selective hydrogenation reaction proceeds to produce dihydrodicyclopentadiene. The most preferable amount of hydrogen added to dicyclopentadiene is one mole per mole of dicyclopentadiene, whereby substantially all dicyclopentadiene is converted into dihydrodicyclopentadiene. However, there is no need to convert all of the dicyclopentadiene to dihydrodicyclopentadiene. The dicyclopentadiene hydrogenated with 0.7 mole of hydrogen per mole of dicyclopentadiene, for example, can produce a polymer of the invention having excellent properties as mentioned before. In this case the polymer is a copolymer of dihydrodicyclopentadiene and dicyclopentadiene not hydrogenated. However, less amount of hydrogen added results in the production of undesired polymer hardly soluble in organic solvents. Though the addition of hydrogene in more than one mole per mole of dicyclopentadiene gives no adverse affect on the properties of the present polymer, it is not recommended in economical view point as the resultant tetrahydrodicyclopentadiene is not polymerized in the subsequent polymerization step.

In the hydrogenation step there may be used catalysts for hydrogenation known in the art, such as nickel, palladium, cobalt, platinum, ruthenium, rhodium, copper and like metals or oxides of these metals, deposited or not deposited on carriers such as activated carbon, diatomaceous earth, etc. The catalyst may be added to the system in the range of 0.05 to 0.2%, based on the weight of the dicyclopentadiene used. The hydrogenation reaction may be preferably carried out at 50 to 150° C. under a pressure of 10 to 100 kg./cm.$^2$, though the reaction proceeds under atmospheric pressure.

According to the present invention dihydrodicyclopentadiene thus obtained is then polymerized. The polymerization may usually be carried out with stirring in the presence of Friedel Crafts metal halide catalysts, such as $AlCl_3$, $AlBr_3$, $ZrCl_4$, $ZrBr_4$, $ZnCl_2$, $ZnBr_2$, $SnCl_4$ $SnBr_4$, $TiCl_4$, $TiBr_4$, etc. The most preferable catalysts are $AlCl_3$ and $AlBr_3$. The catalysts may be used in the amount of 1 to 10%, based on the weight of the dihydrodicyclopentadiene. The polymerization reaction may be usually carried out at an elevated temperature of 60 to 150° C., preferably 90 to 120° C., though the reaction may proceed at room temperature. In order to secure homogeneous polymerization reaction it is preferable to carry out the polymerization in the presence of solvents. The examples of the solvents are kerosene, mineral spirit and like aliphatic hydrocarbons, benzene, toluene, xylene and like aromatic hydrocarbons, cyclohexane and like alicyclic hydrocarbons, ethylene chloride, carbon tetrachloride and like halogenated hydrocarbons. The amount of solvents used may vary over a wide range, but preferably may be used in the range of 25 to 100 weight parts, based on 100 weight parts of the dihydrodicyclopentadiene used.

The polymerization terminates by adding water, alkali solution or mineral acid solution to the system to hydrolyze the catalyst or by blowing ammonia gas into the system to form a complex compound with the catalyst. The resultant polymer may be obtained by washing the resultant reaction product with water and distillating off the solvent, unreacted monomer and low-boiling substance.

For the purpose of further improving color and weatherproofing property, the resultant polymer may further be hydrogenated in the conventional manner, as required.

For better understanding of the invention examples are given below, in which all parts and percentages are by weight.

EXAMPLE 1

In a 500 ml. autoclave were placed 200 g. of dicyclopentadiene and 0.2 g. of palladium-carbon catalyst. To the system hydrogen gas was introduced with stirring at 80 to 100° C. for 2 hours to maintain the reaction pressure at 15 to 20 kg./cm.$^2$. After reaction the contents were taken out from the autoclave and the catalyst was filtered off, whereby a colourless transparent oily substance, melting at 40° C. was obtained. Said oily subsubstance had an odour resembling that of terpenes, and the bromine value thereof was reduced to about half that of dicyclopentadiene. By gas chromatographic analysis thereof it was found to contain 90.8% of dihydrodicyclopentadiene, 5.1% of tetrahydrodicyclopentadiene, 2.7% of unreacted dicyclopentadiene and 2.7% of unknown substance.

100 g. of the resultant oily substance and 50 g. of toluene were placed in a 500 ml. flask, to which was added 5 g. of anhydrous aluminium chloride. The mixture was stirred for 5 hours at 60–80° C. in the nitrogen gas stream for polymerization. Thereafter 50 ml. of 3% aqueous solution of sodium hydroxide was added to hydrolyze the catalyst. The resultant reaction mixture was left to stand to separate oil layer from aqueous layer and the oil layer was washed with water, whereby a light yellow resin solution was obtained. The toluene and unreacted oily substance were recovered by distillation, and 91 g. of a resin was obtained, which had a molecular weight of 440, softening point of 75° C. and bromine value of 22. 10 g. of the resultant resin was easily dissolved in 10 g. of benzene to produce homogeneous solution and no insoluble portion was observed.

For comparison 100 g. of dicyclopentadiene and 200 g. of toluene were placed in a 500 ml. flask, to which 5 g. of anhydrous aluminium chloride was added. The mixture was stirred at 50–60° C. for 5 hours to polymerize the dicyclopentadiene. The resultant polymer was separated from the reaction mixture in the same manner as in Example 1. To test the solubility of the polymer in organic solvents, 10 g. of the polymer was added with stirring to 10 g. of benzene. Thus it was found that 5.6 g. of the polymer was dissolved but 4.4 g. was left insoluble.

To test the characteristics of the resin obtained 30 parts of the resin was mixed with 100 parts of natural rubber, and tackiness, adhesion and cohesion of the resultant mixture were measured in the following manner.

TACKINESS

The tackiness was measured in accordance with the method described in "Test Method for Pressure-Sensitive Tapes" (published by the Specification and Technical Committee of P.S.T.C.), in which a steel ball, 15 mm. in diameter, was allowed to roll down by its own weight from a point 10 cm. from the bottom of the slope 30° and to roll on the surface of cellophane film coated with the resultant mixture, and the distance at which the ball stopped was measured to determine tackiness. Therefore the smaller value thereof indicates the higher tackiness.

ADHESION

Cellophane film, 15 mm. x 100 mm., was coated with the resultant mixture to be tested, to which glass plate was adhered. The adhesion was determined by measuring a load required for peeling off the glass at a rate of 1000 mm./min. at 180° C. 12 hours after the adhesion.

COHESION

A glass plate was coated with the resultant mixture to be tested and exposed to ultraviolet rays emitted from 20-W fluorescent lamp placed 20 cm. apart from the plate. The cohesion was determined by measuring the period when the tackiness of the adhesive was lost.

For comparison, a glycerin ester of rosin (Ester Gum), polyterpene ("Piccolyte S–100" of Pennsylvania Industrial Chemical Corporation, U.S.A.) and aromatic hydrocarbon resin ("Petrosin No. 100" of Mitsui Petrochemical Industrial Ltd., Japan) were used in place of the present resin, and the characteristics as the tackifier were measured in the same manner as above. The results are shown in Table I below:

TABLE 1

|  | Resin of Example 1 | Rosin ester | Polyterpene | Aromatic resin |
|---|---|---|---|---|
| Tackiness (cm.) | 4.0 | 5.0 | 3.5 | 7.0 |
| Adhesion (g./15 mm.) | 300 | 300 | 310 | 300 |
| Cohesion (g./5×15 mm.$^2$) | 1,020 | 800 | 1,070 | |

EXAMPLE 2

In a 500 ml. autoclave were placed 200 g. of dicyclopentadiene and 0.5 g. of reduced nickel-diatomaceous earth catalyst. To the system hydrogen gas was introduced with stirring at 60–80° C. for 1 hour to maintain the reaction pressure at 15 to 20 kg./cm.$^2$, whereby was obtained an oily substance containing 87% of dihydrodicyclopentadiene, 9% of tetrahydrodicyclopentadiene, 2% of unreacted dicyclopentadiene and 2% of unknown substance.

100 g. of the oily substance was dissolved in 50 g. of toluene and to the solution 8 g. of anhydrous aluminium bromide was added. The resultant mixture was heated at 100 to 110° C. for 5 hours.

Separated from this mixture in the same manner as in Example 1 was 85 g. of resin having a molecular weight of 480, softening point of 103° C. and bromine value of 18. The property of this resin as a tackifier for rubber was measured in the manner similar to that of Example 1, with the results as shown in Table 2.

TABLE 2

|  | Resin of Example 1 | Rosin ester | Polyterpene | Aromatic resin |
|---|---|---|---|---|
| Tackiness | 4.5 | 5.0 | 4.0 | 9.0 |
| Adhesion | 310 | 350 | 320 | 310 |

EXAMPLE 3

In a 500 ml. autoclave were placed 200 g. of dicyclopentadiene and 0.1 g. of palladium-carbon catalyst. To the system hydrogen gas was introduced at 80° C. for 2 hours to maintain the pressure at 10 to 15 kg./cm.$^2$, whereby was obtained oily substance containing 72% of dihydrodicyclopentadiene, 3% of tetrahydrodicyclopentadiene, 23% of unreacted dicyclopentadiene and 2% unknown compound.

150 g. of the oily substance thus obtained was dissolved in 50 g. of toluene and to the solution 7.5 g. of anhydrous aluminium chloride was added. The resultant mixture was heated at 110° C. for 5 hours for polymerization and the resultant polymer was separated from the reaction mixture in the same manner as in Example 1, whereby 146 g. of resin having color (Gardner) of 16, molecular weight of 500, softening, point of 126° C. and bromine value of 27 was obtained.

What we claim is:

1. A process for manufacturing a polymer of dicyclopentadiene derivative, which comprises hydrogenating dicyclopentadiene to produce dihydrodicyclopentadiene and polymerizing the resultant dihydrodicyclopentadiene in the presence of a Friedel-Crafts metal halide catalyst.

2. The process for manufacturing a polymer of dicyclopentadiene derivative according to claim 1, in which said dicyclopentadiene is hydrogenated with at least 0.7 mole of hydrogen per mole of the dicyclopentadiene.

3. The process for manufacturing a polymer of dicyclopentadiene derivative according to claim 1, in which said metal halide catalyst is one species selected from the group consisting of $AlCl_3$, $AlBr_3$, $ZrCl_4$, $ZrBr_4$, $ZnCl_2$, $ZnBr_2$, $SnCl_4$, $SnBr_4$, $TiCl_4$ and $TiBr_4$.

4. The process for manufacturing a polymer of dicyclopentadiene derivative according to claim 3, in which said metal halide catalyst is one species selected from the group consisting of $AlCl_3$ and $AlBr_3$.

5. The process for manufacturing a polymer of dicyclopentadiene derivative according to claim 1, in which said polymerization is carried out in the presence of an organic solvent.

References Cited

UNITED STATES PATENTS

| 3,023,200 | 2/1962 | Epstein et al. | 260—93.1 |
| 3,062,800 | 11/1962 | Dissen | 260—93.1 |
| 3,074,918 | 1/1963 | Eleutemo | 260—93.1 |
| 3,084,147 | 4/1963 | Wilks | 260—93.1 |

JOSEPH L. SCHOFER, Primary Examiner

R. A. GAITHER, Assistant Examiner